United States Patent
Matsuzaki

(10) Patent No.: US 9,582,624 B2
(45) Date of Patent: Feb. 28, 2017

(54) CIRCUIT COMPONENT MIGRATION METHOD AND APPARATUS

(71) Applicant: FUJITSU LIMITED, Kawasaki-shi, Kanagawa (JP)

(72) Inventor: Kazuhiro Matsuzaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 13/624,136

(22) Filed: Sep. 21, 2012

(65) Prior Publication Data

US 2013/0125071 A1    May 16, 2013

(30) Foreign Application Priority Data

Nov. 15, 2011   (JP) .................................. 2011-250064

(51) Int. Cl.
    *G06F 17/50*        (2006.01)
(52) U.S. Cl.
    CPC ........ *G06F 17/5045* (2013.01); *G06F 17/505* (2013.01); *G06F 17/5068* (2013.01); *G06F 17/5072* (2013.01); *G06F 2217/74* (2013.01)
(58) Field of Classification Search
    None
    See application file for complete search history.

(56) References Cited

U.S. PATENT DOCUMENTS

| | | | |
|---|---|---|---|
| 6,950,995 B2* | 9/2005 | Hegde ................ | G06F 17/5045 716/103 |
| 6,951,017 B1* | 9/2005 | Dalton .................... | G06F 8/30 703/4 |
| 6,968,518 B2* | 11/2005 | Hegde et al. ................ | 716/102 |
| 6,983,430 B2* | 1/2006 | Hegde et al. ................ | 716/103 |
| 7,039,881 B2* | 5/2006 | Regan ................ | H01L 27/0207 716/103 |
| 8,516,410 B2* | 8/2013 | Nahmanny ......... | G06F 17/5063 716/103 |

FOREIGN PATENT DOCUMENTS

| | | |
|---|---|---|
| JP | 4-107783 | 4/1992 |
| JP | 7-36946 | 2/1995 |
| JP | 9-282335 | 10/1997 |
| JP | 2005-316741 | 11/2005 |

OTHER PUBLICATIONS

Japanese Office Action dated Jul. 7, 2015 in corresponding Japanese Patent Application No. 2011-250064.

* cited by examiner

*Primary Examiner* — Leigh Garbowski
(74) *Attorney, Agent, or Firm* — Staas & Halsey LLP

(57) ABSTRACT

An circuit-component-migration-apparatus is a computer that performs migration of design data between different pieces of circuit design software. The circuit component migration apparatus may be a design apparatus in which circuit design software of a migration destination of design data operates. The circuit component migration apparatus includes a storage unit, an obtaining unit, and a control unit.

3 Claims, 12 Drawing Sheets

FIG. 2

| MIGRATION SOURCE COMPONENT | MIGRATION DESTINATION COMPONENT |
|---|---|
| A | NA |
| B | NB |
| C | NC |
| D | ND |
| E | NE |

FIG. 3

| | COMPONENT NAME | SYMBOL 1 | SYMBOL 2 | ... | SYMBOL N | CHARACTERISTIC VALUE | UNIT COST, ETC. |
|---|---|---|---|---|---|---|---|
| 1 | NA | SA | SSA | | | | |
| 2 | NB | SB | | | | | |
| 3 | NC | SC | | | | | |
| 4 | ND | SD | | | | | |
| 5 | NE | SE | | | | | |

| | SYMBOL NAME | SHAPE |
|---|---|---|
| 1 | SA | ─▭─ 20a |
| 2 | SB | ─▷ 20b |
| 3 | SC | ─▷ 20c |
| 4 | SD | ─▷ǀ 20d |
| 5 | SE | ─▭─ 20e |
| 6 | SSA | ─┤├─ 20f |

FIG. 6

| MIGRATION SOURCE COMPONENT NAME | MIGRATION DESTINATION COMPONENT NAME |
|---|---|
| PA | PN-A |
| PB | PN-B |
| PC | PN-C |
| PD | PN-D |

FIG. 7

| COMPONENT NAME | SYMBOL 1 | SYMBOL 2 | ... | SYMBOL N | CHARACTERISTIC VALUE | UNIT COST, ETC. |
|---|---|---|---|---|---|---|
| PN-A | AND2 | | | | | |
| PN-B | NOT | | | | | |
| PN-C | BUF | | | | | |
| PN-D | RES | | | | | |

| SYMBOL NAME | SHAPE |
|---|---|
| AND2 |  32a |
| NOT |  32b |
| BUF |  32c |
| RES |  32d |

| COMPONENT NAME | SYMBOL NAME | SHAPE |
|---|---|---|
| PA | AND2 |  31a |
| PB | INV |  31b |
| PC | BUF |  31c |
| PD | R |  31d |

FIG. 10

| | COMPONENT NAME | MIGRATION DESTINATION CORRESPONDENCE COMPONENT NAME |
|---|---|---|
| 1 | PA | N/A |
| 2 | PB | N/A |
| 3 | PC | N/A |
| 4 | PD | N/A |

FIG. 11

| SYMBOL NAME | FINAL SYMBOL NAME |
|---|---|
| AND2 | N/A |
| INV | N/A |
| BUF | N/A |
| R | N/A |

FIG. 12
| COMPONENT NAME | MIGRATION DESTINATION CORRESPONDENCE COMPONENT NAME |
|---|---|
| PA | PN-A |
| PB | PN-B |
| PC | PN-C |
| PD | PN-D |
FIG. 13
| MIGRATION SOURCE | | MIGRATION DESTINATION | |
|---|---|---|---|
| SYMBOL NAME | SYMBOL | SYMBOL NAME | SYMBOL |
| AND2 | 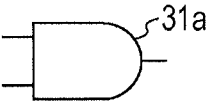 | AND2 | 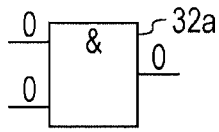 |
| INV | 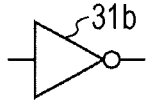 | NOT | 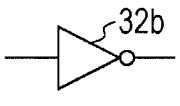 |
| BUF | 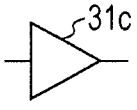 | BUF | 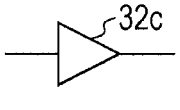 |
| R |  | RES | 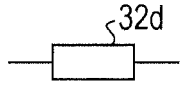 |

FIG. 14

|   | SYMBOL NAME | FINAL SYMBOL NAME |
|---|---|---|
| 1 | AND2 | AND2-1 |
| 2 | INV | NOT |
| 3 | BUF | BUF |
| 4 | R | R |

| SYMBOL NAME | SHAPE |
|---|---|
| AND2-1 |  31a |
| AND2 |  32a |
| NOT |  32b |
| BUF |  32c |
| R |  31d |
| RES |  32d |

| | COMPONENT NAME | SYMBOL 1 | SYMBOL 2 | ... | SYMBOL N | CHARACTERISTIC VALUE, UNIT COST, ETC. |
|---|---|---|---|---|---|---|
| 1 | PN-A | AND2 | AND2-1 | | | VALID DATA |
| 2 | PN-B | NOT | | | | VALID DATA |
| 3 | PN-C | BUF | | | | VALID DATA |
| 4 | PN-D | RES | R | | | VALID DATA |

CIRCUIT COMPONENT MIGRATION METHOD AND APPARATUS

CROSS-REFERENCE TO RELATED APPLICATION

This application is based upon and claims the benefit of priority of the prior Japanese Patent Application No. 2011-250064, filed on Nov. 15, 2011, the entire contents of which are incorporated herein by reference.

FIELD

The embodiments discussed herein are related to a circuit component migration apparatus, a circuit component migration program, and a circuit component migration method.

BACKGROUND

In the related art, circuit design software to perform circuit design such as computer aided design (CAD) is known. In circuit design software, a unique shape may be used for a symbol representing a circuit component for some circuit components in each piece of software.

A technology has been proposed in which design data is migrated between such different pieces of circuit design software. For example, a technology has been proposed in which CAD data of a conversion source is converted into CAD data having another format based on conversion specification data that prescribes specification of conversion. In addition, a technology has been proposed by which circuit diagram information is extracted from circuit diagram information of a conversion source, a conversion information database is searched for conversion information of a corresponding symbol, and the circuit diagram information and the conversion information are combined to generate circuit diagram information of a conversion destination.

Japanese Laid-open Patent Publication No. 2005-316741 and Japanese Laid-open Patent Publication No. 7-36946 are examples of the related art.

However, in the related art, there are technologies with which data of a circuit component of a migration source is converted into data of a circuit component corresponding to circuit design software of a migration destination, and the shapes of symbols representing the circuit components of the migration source and the migration destination may be different.

A technology according to the embodiments discussed herein is made in view of the above circumstances, and an object of the technology is to provide a circuit component migration apparatus, a circuit component migration program, and a circuit component migration method by which a symbol is allowed to be taken over to migrate a circuit component.

SUMMARY

According to an aspect of the application, an apparatus includes a storage unit that stores correspondence information indicating a circuit component of a migration destination corresponding to a circuit component of a migration source, an identification unit that identifies a circuit component of the migration destination corresponding to a circuit component that is a target to be migrated based on the correspondence information, a comparison unit that compares a shape of a symbol representing the circuit component identified by the identification unit of the migration destination with a shape of a symbol representing the circuit component that is a target to be migrated, and a registration unit that associates the symbol representing the circuit component that is a target to be migrated with the identified circuit component of the migration destination and registers the associated symbol and identified circuit component in component information indicating a circuit component of the migration destination when the shapes are different based on a result of the comparison made by the comparison unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of data configuration of correspondence information;

FIG. 3 illustrates an example of data configuration of a component library;

FIG. 6 illustrates an example of data configuration of the correspondence information;

FIG. 7 illustrates an example of data configuration of the component library;

FIG. 10 illustrates an example of data configuration of component name list information;

FIG. 11 illustrates an example of data configuration of symbol list information;

FIG. 12 illustrates an example of data configuration of the component name list information in which component names are stored in the item "migration destination correspondence component name";

FIG. 13 illustrates results obtained by obtaining symbol names and symbols in a migration source and symbol names and symbols in a migration destination of the circuit components 30a to 30d that are targets to be migrated;

FIG. 14 illustrates an example of data configuration of the symbol list information in which final symbol names are stored;

DESCRIPTION OF EMBODIMENTS

A circuit component migration apparatus, a circuit component migration program, and a circuit component migration method according to the embodiments discussed herein are described in detail below with reference to the accompanying drawings. The embodiments are not limited to the apparatus, program, and method. In addition, the embodiments may be combined as long as there is no inconsistency in processing details.

[First Embodiment]

Figure 1:
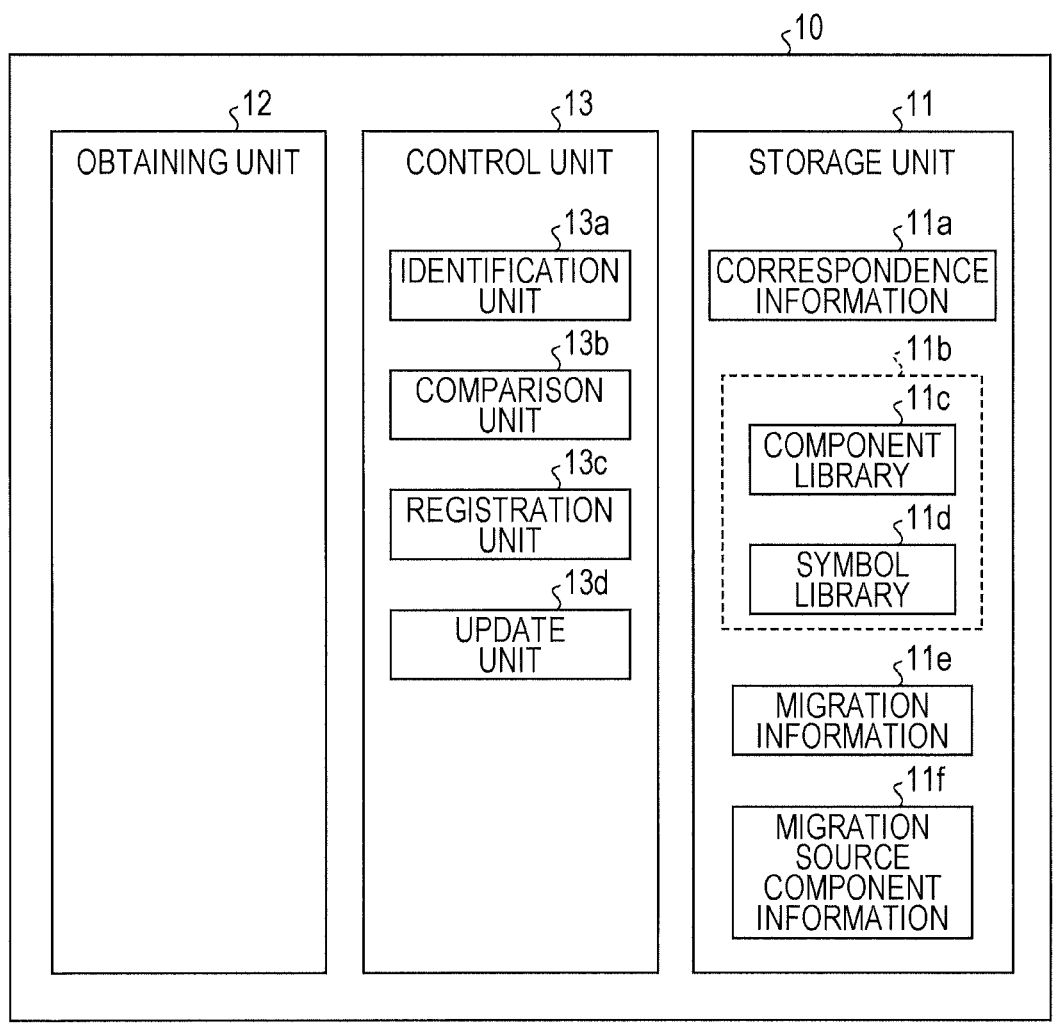
FIG. 1 illustrates a general configuration of a circuit component migration apparatus.

A circuit component migration apparatus according to a first embodiment is described. FIG. 1 illustrates a general configuration of a circuit component migration apparatus 10. A circuit component migration apparatus 10 is a computer that performs migration of design data between different pieces of circuit design software. For example, the circuit component migration apparatus 10 may be a design apparatus in which circuit design software of a migration destination of design data operates. As illustrated in FIG. 1, the circuit component migration apparatus 10 includes a storage unit 11, an obtaining unit 12, and a control unit 13.

The storage unit 11 stores various pieces of information. For example, the storage unit 11 stores correspondence information 11a, migration destination component information 11b, migration information 11e, and migration source component information 11f. The migration destination component information 11b includes various pieces of information related to a circuit component used for circuit design in circuit design software of a migration destination of the circuit component. In the first embodiment, the migration destination component information 11b includes a component library 11c and a symbol library 11d. An example of the storage unit 11 as a device includes a data-rewritable semiconductor memory such as a flash memory and a nonvolatile static random access memory (NVSRAM), and a storage device such as a hardware disk and an optical disk.

The correspondence information 11a indicates a correspondence relationship between respective circuit components used for circuit design in different pieces of circuit design software. For example, the correspondence information 11a indicates a circuit component of a migration destination corresponding to a circuit component of a migration source. FIG. 2 illustrates an example of data configuration of the correspondence information 11a. As illustrated in FIG. 2, the correspondence information 11a includes items "migration source component" and "migration destination component". The item "migration source component" is an area in which the component name of a circuit component of a migration source is stored. The item "migration destination component" is an area in which the component name of a circuit component of a migration destination is stored. In the example of FIG. 2, a circuit component having a component name "A" of the migration source corresponds to a circuit component having a component name "NA" of the migration destination. In addition, a circuit component having a component name "B" of the migration source corresponds to a circuit component having a component name "NB" of the migration destination. In addition, a circuit component having a component name "C" of the migration source corresponds to a circuit component having a component name "NC" of the migration destination. In addition, a circuit component having a component name "D" of the migration source corresponds to a circuit component having a component name "ND" of the migration destination. In addition, a circuit component having a component name "E" of the migration source corresponds to a circuit component having a component name "NE" of the migration destination.

The information indicating the correspondence relationship of the circuit components between the migration source and the migration destination in the correspondence information 11a may be registered beforehand at a creation source of circuit component migration software that performs migration of a circuit component between different pieces of circuit design software. In addition, the information indicating the correspondence relationship of the circuit components between the migration source and the migration destination in the correspondence information 11a may be registered from a not-illustrated input unit by an administrator or a terminal device such as a client computer that is allowed to communicate with the circuit component migration apparatus 10. The correspondence information 11a is used for a process executed in an identification unit 13a that is described later.

The component library 11c is a table that stores a component name of a circuit component used for circuit design in circuit design software of a migration destination, specification information that specifies a symbol representing a circuit component, and various pieces of attribute information on the circuit component. FIG. 3 illustrates an example of data configuration of the component library 11c. As illustrated in FIG. 3, the component library 11c includes items "component name", "symbols 1" to "symbol N", "characteristic value", and "unit cost". The item "component name" is an area in which a component name prescribed for each circuit component is stored. The items "symbols 1" to "symbol N" are areas in which symbol names of symbols indicating circuit components are stored. In the component library 11c, a plurality of symbols used to represent a circuit component may be specified by storing a symbol name in the items "symbols 1" to "symbol N". The item "characteristic value" is an area in which a value indicating a specific characteristic included in a circuit component is stored as attribute information on the circuit component. The item "unit cost" is an area in which a unit cost of a circuit component is stored as attribute information on the circuit component. Each of the items "symbols 2" to "symbol N", "characteristic value", and "unit cost" is a given setting item. In the example of FIG. 3, an item to which information is not set is indicated as a blank. In the example of FIG. 3, the circuit component having the component name "NA" is represented by one of symbols having symbol names "SA" and "SSA". In addition, the circuit component having the component name "NB" is represented by a symbol having a symbol name "SB". In addition, the circuit component having the component name "NC" is represented by a symbol having a symbol name "SC". In addition, the circuit component having the component name "ND" is represented by a symbol having a symbol name "SD". In addition, the circuit component having the component name "NE" is represented by a symbol having a symbol name "SE".

Figures 4, 5:
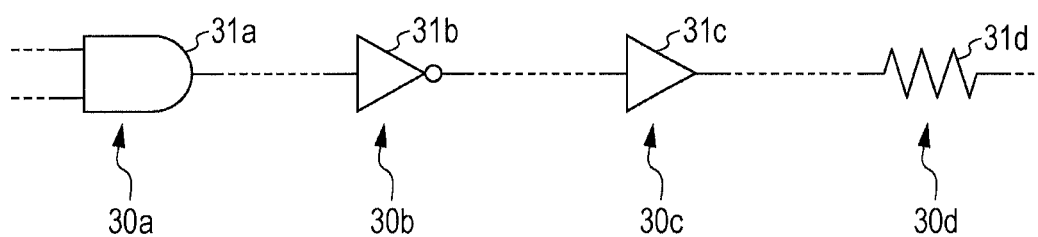
FIG. 4 illustrates an example of data configuration of a symbol library.
FIG. 5 illustrates an example of migration information.

The symbol library 11d is a table in which the shape of a symbol representing a circuit component is stored. FIG. 4 illustrates an example of data configuration of the symbol library 11d. As illustrated in FIG. 4, the symbol library 11d includes the items "symbol name" and "shape". The item "symbol name" is an area in which a symbol name prescribed for each symbol is stored. The item "shape" is an area in which image information indicating a symbol is stored. In the first embodiment, the image information stored in the item "shape" is illustrated as a graphic symbol indicated by the image information.

In the example of FIG. 4, the symbol having the symbol name "SA" is a symbol 20a. In addition, the symbol having the symbol name "SB" is a symbol 20b. In addition, the symbol having the symbol name "SC" is a symbol 20c. In addition, the symbol having the symbol name "SD" is a symbol 20d. In addition, the symbol having the symbol name "SE" is a symbol 20e. In addition, the symbol having the symbol name "SSA" is a symbol 20f.

Various pieces of information of the component library 11c and the symbol library 11d are registered beforehand at a creation source of circuit design software of a migration destination. When a circuit component is allowed to be registered by an administrator in circuit design software of a migration destination, the various pieces of information of the component library 11c and the symbol library 11d may be registered by the administrator. The component library 11c and the symbol library 11d are used for processes executed in the identification unit 13a, a comparison unit 13b, and a registration unit 13c that are described later.

The migration information 11e includes information on a circuit component that is a target to be migrated. For example, the migration information 11e may be information on a mere circuit component that is a target to be migrated and may be design data in which the circuit component that is a target to be migrated is arranged on a substrate. The migration source component information 11f stores various pieces of information related to a component name, a symbol name, and a symbol of a circuit component included in the migration information 11e.

FIG. 5 illustrates an example of the migration information 11e. The example of FIG. 5 illustrates a case in which the migration information 11e is design data in which the circuit components 30a to 30d that are targets to be migrated are arranged on a substrate. In the circuit component 30a, the component name is "PA", and the symbol name of a symbol 31a representing the circuit component 30a is "AND2". In the circuit component 30b, the component name is "PB", and the symbol name of a symbol 31b representing the circuit component 30b is "INV". In the circuit component 30c, the component name is "PC", and the symbol name of a symbol 31c representing the circuit component 30c is "BUF". In the circuit component 30d, the component name is "PD", and the symbol name of a symbol 31d representing the circuit component 30d is "R".

The migration information 11e and the migration source component information 11f are obtained by the obtaining unit 12 that is described later and stored in the storage unit 11. The migration information 11e and the migration source component information 11f are used for processes executed in the identification unit 13a, the comparison unit 13b, the registration unit 13c, and an update unit 13d that are described later.

Returning to the description of FIG. 1, the obtaining unit 12 obtains various pieces of information. For example, the obtaining unit 12 obtains the migration information 11e and the migration source component information 11f. The obtaining unit 12 may obtain the migration information 11e and the migration source component information 11f by, for example, reading the information from a storage medium such as a flexible disk (FD), a compact disc-read-only memory (CD-ROM), and an integrated circuit (IC) card that are inserted into the circuit component migration apparatus 10. In addition, the obtaining unit 12 may obtain the migration information 11e and the migration source component information 11f by accessing another computer through a network such as a public line, the Internet, a local area network (LAN), or a wide area network (WAN). The obtaining unit 12 causes the storage unit 11 to store the obtained migration information 11e and migration source component information 11f.

The control unit 13 is, for example, an electronic circuit such as a central processing unit (CPU) including an internal memory, etc., and includes the identification unit 13a, the comparison unit 13b, the registration unit 13c, and the update unit 13d.

The identification unit 13a performs various types of identification. For example, the identification unit 13a identifies a circuit component of a migration destination corresponding to a circuit component included in the migration information 11e based on the correspondence information 11a. The identification of the circuit component of the migration destination is performed, for example, as follows.

The correspondence information 11a includes settings illustrated in FIG. 6 for the circuit components 30a to 30d that are targets to be migrated. FIG. 6 illustrates an example of data configuration of the correspondence information 11a. In the example of FIG. 6, a circuit component having a component name "PA" of the migration source corresponds to a circuit component having a component name "PN-A" of the migration destination. In addition, a circuit component having a component name "PB" of the migration source corresponds to a circuit component having a component name "PN-B" of the migration destination. In addition, a circuit component having a component name "PC" of the migration source corresponds to a circuit component having a component name "PN-C" of the migration destination. In addition, a circuit component having a component name "PD" of the migration source corresponds to a circuit component having a component name "PN-D" of the migration destination.

In addition, the component library 11c includes settings illustrated in FIG. 7 for the circuit components having the component names "PN-A" to "PN-D". FIG. 7 illustrates an example of data configuration of the component library 11c. In the example of FIG. 7, the circuit component having the component name "PN-A" is represented by a symbol having a symbol name "AND2". In addition, the circuit component having the component name "PN-B" is represented by a symbol having a symbol name "NOT". In addition, the circuit component having the component name "PN-C" is represented by a symbol having a symbol name "BUF". In addition, the circuit component having the component name "PN-D" is represented by a symbol having a symbol name "RES".

Figure 8:
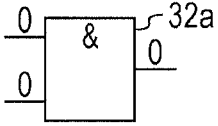
FIG. 8 illustrates an example of data configuration of the symbol library.
Figure 8:
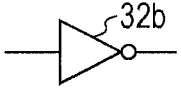
Figure 8:
Figure 8:

In addition, the symbol library 11d includes settings illustrated in FIG. 8 for the symbols having the symbol names "AND2", "NOT", "BUF", and "RES". FIG. 8 illustrates an example of data configuration of the symbol library 11d. In the example of FIG. 8, the symbol having the symbol name "AND2" is a symbol 32a. In addition, the symbol having the symbol name "NOT" is a symbol 32b. In addition, the symbol having the symbol name "BUF" is a symbol 32c. In addition, the symbol having the symbol name "RES" is a symbol 32d.

Figure 9:
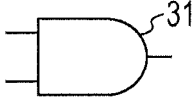
FIG. 9 illustrates results obtained by identifying a component name, a symbol name, and a symbol of a circuit component included in the migration information illustrated in FIG. 5.
Figure 9:
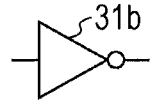
Figure 9:
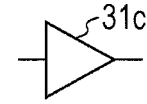
Figure 9:

The identification unit 13a extracts information on a circuit component included in the migration information 11e as information on a circuit component that is a target to be migrated and identifies the component name, the symbol name, and the symbol of the circuit component that is a target to be migrated based on the migration source component information 11f. FIG. 9 illustrates results obtained by identifying the component name, the symbol name, and the symbol of a circuit component included in the migration information 11e illustrated in FIG. 5. The example of FIG. 9 illustrates the component name, the symbol name, and the symbol for each of the circuit components 30a to 30d.

The identification unit 13a temporarily creates component name list information and symbol list information for a circuit component that is a target to be migrated. FIG. 10 illustrates an example of data configuration of the component name list information. As illustrated in FIG. 10, the component name list information includes items "component name" and "migration destination correspondence component name". The item "component name" is an area in which the component name of a circuit component that is a target to be migrated is stored. The item "migration destination correspondence component name" is an area in which the component name of a circuit component of a migration destination corresponding to a circuit component that is a target to be migrated is stored. In the example of FIG. 10, the component names "PA", "PB", "PC", and "PD" of the circuit components 30a to 30d that are targets to be migrated are stored in the items "component name", respectively. "N/A" in the item "migration destination correspondence component name" indicates that the component name of a corresponding circuit component of the migration destination is not stored in the item. In the example of FIG. 10, the component names of circuit components of the migration destination corresponding to the circuit components 30a to 30d that are targets to be migrated are not allowed to be identified.

FIG. 11 illustrates an example of data configuration of the symbol list information. As illustrated in FIG. 11, the symbol list information includes the items "symbol name" and "final symbol name". The item "symbol name" is an area in which a symbol name of a circuit component that is a target to be migrated is stored. The item "final symbol name" is an area in which a final symbol name when a symbol name is changed is stored. In the example of FIG. 11, in the item "symbol name", the symbol names "AND2", "INV", "BUF", and "R" of the circuit components 30a to 30d that are targets to be migrated are stored. "N/A" in the item "final symbol name" indicates that a final symbol name is not stored in the item. In the example of FIG. 11, final symbol names of circuit components of a migration destination corresponding to the circuit components 30a to 30d that are targets to be migrated are not allowed to be determined.

The identification unit 13a identifies a component name of a migration destination corresponding to a circuit component that is a target to be migrated based on the correspondence information 11a and stores the identified component name in the item "migration destination correspondence component name" of the component name list information. For example, the identification unit 13a identifies the component names "PN-A" to "PN-D" of the circuit components of a migration destination corresponding to the component names "PA" to "PD" of the circuit components 30a to 30d by referring to the correspondence information 11a illustrated in FIG. 6 in a case of the circuit components 30a to 30d that are targets to be migrated. In addition, the identification unit 13a stores the identified component name of the circuit component of the migration destination in the item "migration destination correspondence component name" of the component name list information illustrated in FIG. 10. FIG. 12 illustrates an example of data configuration of the component name list information in which the component names are stored in the item "migration destination correspondence component name". The example of FIG. 12 indicates that, in the circuit component having the component name "PA" of the migration source, a corresponding circuit component of the migration destination is the circuit component having the component name "PN-A". In addition, the example of FIG. 12 indicates that, in the circuit component having the component name "PB" of the migration source, a corresponding circuit component of the migration destination is the circuit component having the component name "PN-B". In addition, the example of FIG. 12 indicates that, in the circuit component having the component name "PC" of the migration source, a corresponding circuit component of the migration destination is the circuit component having the component name "PN-C". In addition, the example of FIG. 12 indicates that, in the circuit component having the component name "PD" of the migration source, a corresponding circuit component of the migration destination is the circuit component having the component name "PN-D".

The comparison unit 13b compares the shape of a symbol of a circuit component that is a target to be migrated with the shape of a symbol of a circuit component of a migration destination corresponding to the circuit component that is a target to be migrated for each circuit component that is a target to be migrated. For example, the comparison unit 13b compares the shapes by performing pattern matching between the symbol of the circuit component that is a target to be migrated and the symbol of the circuit component of the migration destination for each of the circuit components that are targets to be migrated to determine the similarity of the symbols.

For example, in the case of comparing the shapes of a symbol of the circuit component 30a that is a target to be migrated and a symbol of a circuit component of a migration destination, the comparison unit 13b obtains the symbol 31a of the circuit component 30a from the identification results of the component names, the symbol names, and the symbols of the circuit components illustrated in FIG. 9. In addition, the comparison unit 13b obtains the component name "PN-A" of the migration destination corresponding to the component name "PA" of the circuit component 30a from the component name list information illustrated in FIG. 12 and obtains the symbol name "AND2" corresponding to the component name "PN-A" from the component library 11c illustrated in FIG. 7. In addition, the comparison unit 13b obtains the symbol 32a having the symbol name "AND2" from the symbol library 11d illustrated in FIG. 8. The comparison unit 13b compares the shape of the symbol 31a with the shape of the symbol 32a. When a plurality of symbol names are registered in the component library 11c and there are a plurality of symbols of a migration destination, the comparison unit 13b individually compares the symbols of the migration destination with a symbol of a circuit component that is a target to be migrated. FIG. 13 illustrates results obtained by obtaining the symbol names and the symbols in the migration source and the symbol names and the symbols in the migration destination of the circuit components 30a to 30d that are targets to be migrated.

The comparison unit 13b determines whether or not there is a symbol having a shape similar to the shape of a symbol of a circuit component that is a target to be migrated in a migration destination based on the comparison result. For example, the comparison unit 13b determines whether or not there is a symbol having a shape similar to the shape of a symbol of a migration source in a migration destination based on whether or not there is a similarity between symbols that is derived by performing the pattern matching and that is more than or equal to a specific threshold value.

In the first embodiment, a case is described in which whether or not the shapes of symbols are similar is determined by performing the pattern matching, however, the first embodiment is not limited to the case. Any technique may be applied to the first embodiment as long as whether or not the shapes of symbols are similar is determined. For example, feature points may be identified which indicate the features of symbols such as intersections, endpoints, and inflection points of lines included in symbols of a migration source and a migration destination, and whether or not the shapes of symbols are similar may be determined from the similarity of positions of feature points of symbols of a migration source and a migration destination by comparing the positions of feature points.

When there is a symbol having a shape similar to the shape of a symbol of a circuit component that is a target to be migrated in a migration destination, the comparison unit 13b stores the symbol name of the symbol of the migration destination that is determined to have a similar shape to that of the symbol of the circuit component that is a target to be migrated, in the item "final symbol name" of the circuit component that is a target to be migrated in the symbol list information. When the symbol names of symbols of a migration source and a migration destination are identical, the comparison unit 13b may store the symbol name of the symbol of the migration source in the item "final symbol name".

On the other hand, when there is no symbol having a shape similar to the shape of a symbol of a circuit component that is a target to be migrated in a migration destination, the comparison unit 13b compares the symbol name of the symbol of the circuit component that is a target to be migrated with each symbol name in the symbol library 11d. For a circuit component that is a target to be migrated for which there is no symbol name in a migration destination, the comparison unit 13b stores the symbol name of a symbol of a migration source in the item "final symbol name" of the circuit component of the symbol list information, based on the comparison result. In addition, for a circuit component that is a target to be migrated for which there is a symbol name in the migration destination, the comparison unit 13b changes the symbol name of the symbol of the circuit component that is a target to be migrated so as not to overlap with that of another symbol. In the first embodiment, the symbol name of a symbol of a circuit component that is a target to be migrated is changed to a symbol name obtained by adding "-" and a number to the symbol name of the symbol of the circuit component that is a target to be migrated, and the number is counted up in ascending order when there is the changed symbol name in the symbol library 11d.

FIG. 14 illustrates an example of data configuration of the symbol list information in which final symbol names are stored. As illustrated in FIG. 13, in the circuit component 30a, the shape of the symbol 31a of the migration source is different from the shape of the symbol 32a of the migration destination, and the symbol names of the symbol 31a of the migration source and the symbol 32a of the migration destination match as "AND2". In this case, the comparison unit 13b changes the symbol name of the symbol 31a of the migration source of the circuit component 30a to "AND2-1", and as illustrated in FIG. 14, stores "AND2-1" in the item "final symbol name" of the symbol name "AND2".

In addition, as illustrated in FIG. 13, in the circuit component 30b, the shape of the symbol 31b of the migration source is similar to the shape of the symbol 32b of the migration destination. In addition, in the circuit component 30c, the shape of the symbol 31c of the migration source is similar to the shape of the symbol 32c of the migration destination. In this case, as illustrated in FIG. 14, the comparison unit 13b stores "NOT" that is the symbol name of the migration destination of the circuit component 30b, in the item "final symbol name" of the symbol name "INV". In addition, the comparison unit 13b stores "BUF" that is the symbol name of the migration destination of the circuit component 30c, in the item "final symbol name" of the symbol name "BUF".

In addition, as illustrated in FIG. 13, in the circuit component 30d, the shape of the symbol 31d of the migration source is different from the shape of the symbol 32d of the migration destination, and the symbol name "R" of the symbol 31d of the migration source is different from the symbol name "RES" of the symbol 32d of the migration destination. In this case, as illustrated in FIG. 14, the comparison unit 13b stores "R" that is the symbol name of the migration source of the circuit component 30d in the item "final symbol name" of the symbol name "R".

Figure 15:
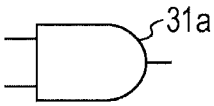
FIG. 15 illustrates an example of data configuration of the symbol library in which the symbols of the circuit components 30a and 30d that are targets to be migrated are stored.
Figure 15:
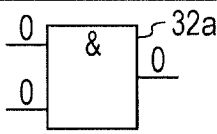
Figure 15:
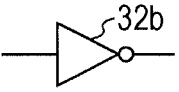
Figure 15:
Figure 15:
Figure 15:
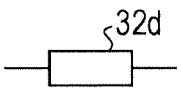
Figures 16, 17:
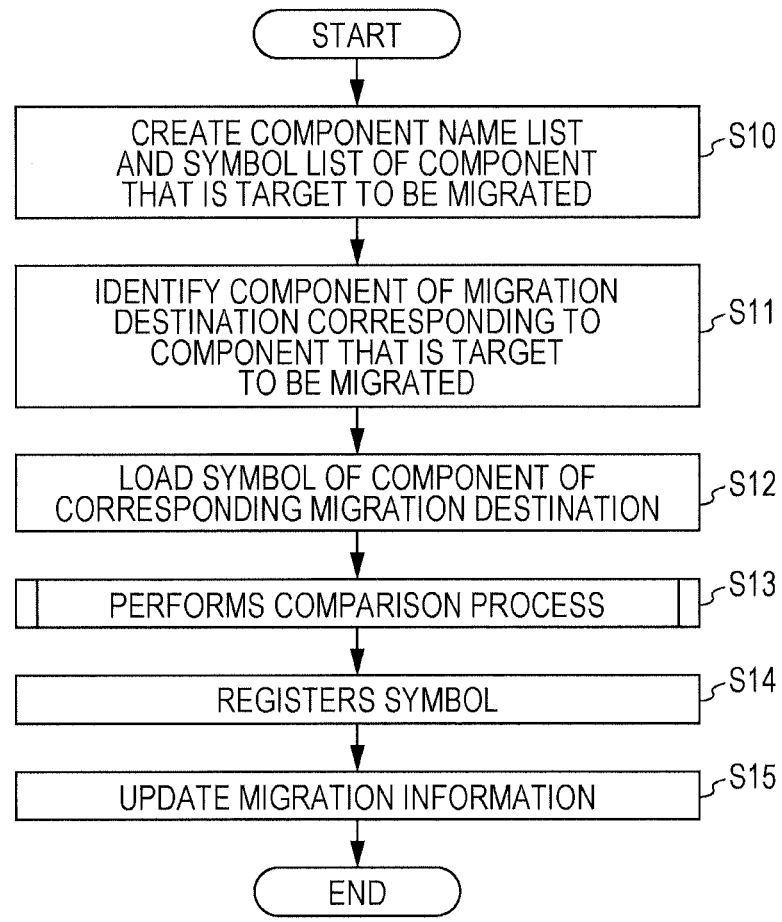
FIG. 16 illustrates an example of data configuration of the component library in which the symbols of the circuit components that are targets to be migrated are stored.
FIG. 17 illustrates a flowchart of a procedure of a migration process.

When the shapes of symbols of a migration source and a migration destination are different and the symbol names of the symbols of the migration source and the migration destination are different, the registration unit 13c registers a symbol representing a circuit component that is a target to be migrated, in the migration destination component information 11b with a symbol name of a circuit component of the migration source based on the comparison results obtained by the comparison unit 13b. In addition, when the shapes of symbols of a migration source and a migration are different and the symbol names of the symbols of the migration source and the migration destination are identical, the registration unit 13c registers a symbol representing a circuit component that is a target to be migrated in the migration destination component information 11b with a changed symbol name based on the comparison results by the comparison unit 13b. For example, in the circuit component 30a, the shape of the symbol 31a of the migration source is different from the shape of the symbol 32b of the migration destination, and the symbol names of the symbol 31a of the migration source and the symbol 32a of the migration destination match as "AND2". The registration unit 13c stores the symbol 31a of the migration source with a changed symbol name "AND2-1" of the migration source in the symbol library 11d. In addition, the registration unit 13c stores the symbol name "AND2-1" as the symbol having the component name "PN-A" of the migration destination of the circuit component 30a in the component library 11c. In addition, for example, in the circuit component 30d, the shape of the symbol 31d of the migration source and the shape of the symbol 32d of the migration destination are different, and the symbol name "R" of the symbol 31d of the migration source and the symbol name "RES" of the symbol 32d of the migration destination are different. The registration unit 13c stores the symbol 31d of the migration source with the symbol name "R" of the migration source in the symbol library 11d. In addition, the registration unit 13c stores the symbol name "R" as the symbol having the component name "PN-D" of the migration destination of the circuit component 30d in the component library 11c. FIG. 15 illustrates an example of data configuration of the symbol library 11d in which the symbols of the circuit components 30a and 30d that are targets to be migrated are stored. In the example of FIG. 15, the symbol 31a is stored with the symbol name "AND2-1", and the symbol 31d is stored with the symbol name "R", additionally. FIG. 16 illustrates an example of data configuration of the component library 11c in which the symbols of the circuit components that are targets to be migrated are stored. In the example of FIG. 16, the symbol name "AND2-1" is stored in the item "symbol 2" of the component name "PN-A", and the symbol name "R" is stored in the item "symbol 2" of the component name "PN-D". As a result, even when the shape of a symbol of a circuit component that is a target to be migrated is different from the shape of a symbol of a circuit component of a migration destination corresponding to the circuit component that is a target to be migrated, the symbol of the migration source is registered in the migration destination component information 11b, so that the symbol is taken overt to migrate the circuit component.

The update unit 13d updates the component name and a symbol name of a circuit component that is a target to be migrated included in the migration information 11e to a component name and a symbol name of a migration destination based on the correspondence information 11a and the symbol list information. For example, targets to be migrated are the circuit components 30a to 30d, the correspondence information 11a includes the setting indicated in FIG. 6, and the symbol list information includes the setting indicated in FIG. 14. In this case, the update unit 13d updates a component name of the circuit component 30a from "PA" to "PN-A" and updates a symbol name of the circuit component 30a from "AND2" to "AND2-1". In addition, the update unit 13d updates a component name of the circuit component 30b from "PB" to "PN-B" and updates a symbol name of the circuit component 30b from "INV" to "NOT". In addition, the update unit 13d updates a component name of the circuit component 30c from "PC" to "PN-C". In addition, the update unit 13d updates a component name of the circuit component 30d from "PD" to "PN-D". As a result, the component name and the symbol name of a circuit component that is a target to be migrated included in the migration information 11e are a component name and a symbol name corresponding to the migration destination component information 11b of the migration destination.

Next, a flow of a migration process for migration information performed by the circuit component migration apparatus 10 according to the first embodiment is described. FIG. 17 illustrates a flowchart of a procedure of the migration process. The migration process is executed at, for example, a timing at which a specific operation to instruct start of migration is performed for the circuit component migration apparatus 10.

As illustrated in FIG. 17, the identification unit 13a extracts information on a circuit component that is a target to be migrated from the migration information 11e, and temporarily creates component name list information and symbol list information on the circuit component that is a target to be migrated based on the migration source component information 11f (operation S10). Next, the identification unit 13a identifies the component name of a circuit component of a migration destination corresponding to the circuit component that is a target to be migrated based on the correspondence information 11a, and stores the identified component name in the item "migration destination correspondence component name" of the component name list information (operation S11). The comparison unit 13b reads out a symbol representing a corresponding circuit component of the migration destination for each circuit component that is a target to be migrated (operation S12). In addition, the comparison unit 13b performs a comparison process to compare the symbol shape of a circuit component that is a target to be migrated with the symbol shape of a circuit component of the migration destination (operation S13).

Figure 18:
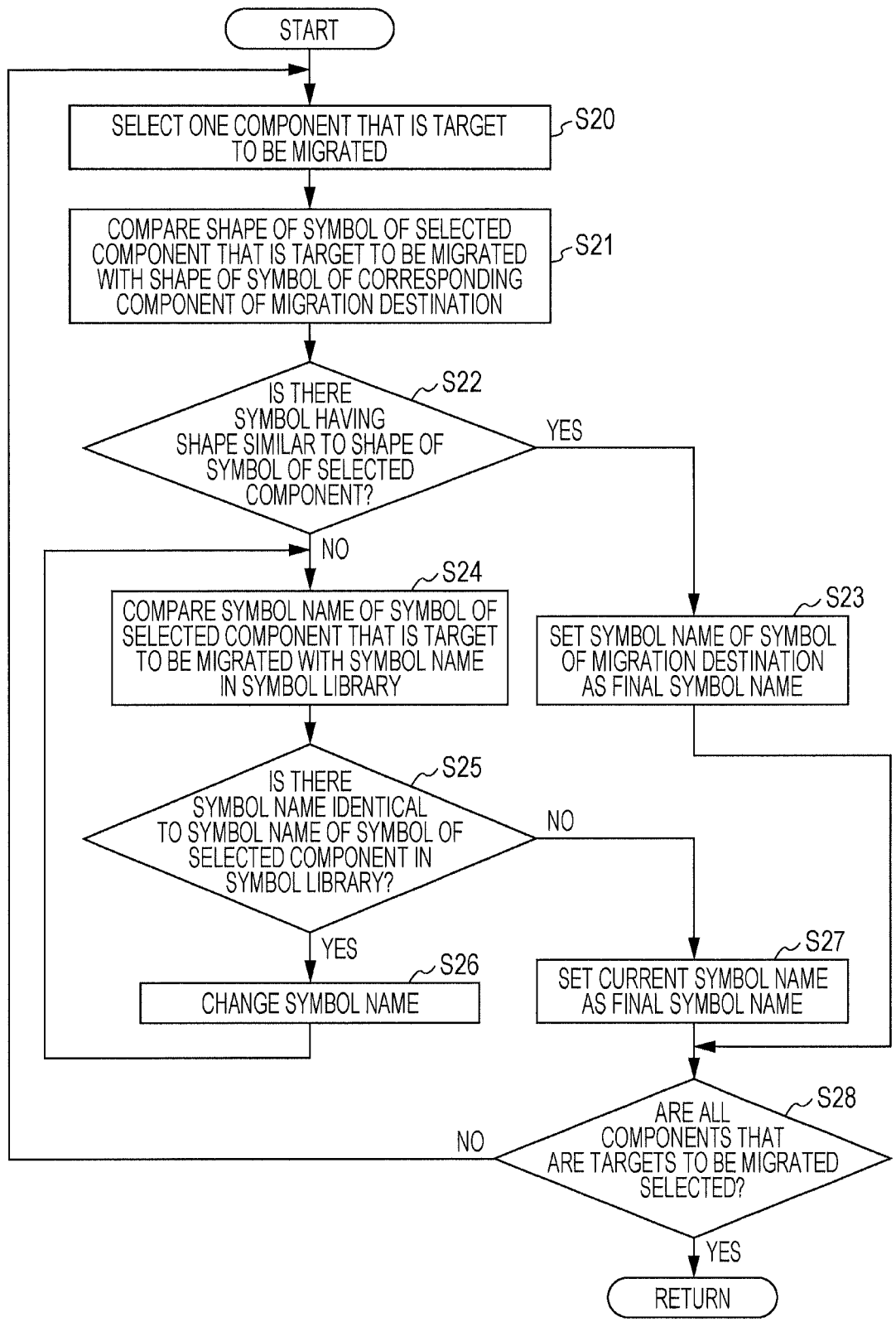
FIG. 18 illustrates a flowchart of a procedure of a comparison process.

FIG. 18 illustrates a flowchart of a procedure of the comparison process. The comparison unit 13b selects one circuit component that is a target to be migrated (operation S20). The comparison unit 13b compares the shape of the symbol of the selected circuit component that is a target to be migrated with the shape of each symbol of a circuit component of the migration destination corresponding to the circuit component that is a target to be migrated (operation S21). The comparison unit 13b determines whether or not there is a symbol having a shape similar to the shape of the symbol of the selected circuit component that is a target to be migrated in the migration destination based on the comparison results (operation S22). When there is a symbol having a shape similar to the shape of the symbol of the selected circuit component in the migration destination (Yes, in operation S22), the comparison unit 13b stores the symbol name of the symbol of the migration destination in the item "final symbol name" of the selected circuit component that is a target to be migrated in the symbol list information (operation S23), and the flow proceeds to operation S28. On the other hand, when there is no symbol having a shape similar to the shape of the symbol of the selected circuit component in the migration destination (No, in operation S22), the comparison unit 13b compares the symbol name of the symbol of the circuit component that is a target to be migrated with each symbol name of the symbol library 11d (operation S24). The comparison unit 13b determines whether or not there is a symbol having a symbol name identical to the symbol name of the symbol of the selected circuit component that is a target to be migrated in the symbol library 11d, based on the comparison results (operation S25). When there is a symbol having a symbol name identical to the symbol name of the symbol of the selected circuit component in the symbol library 11d (Yes, in operation S25), the symbol name of the symbol of the selected circuit component that is a target to be migrated is changed (operation S26), and the flow proceeds to operation S24 again. As a result, the comparison unit 13b compares the changed symbol name with each symbol name of the symbol library 11d. The processes from operations S24 to S26 are repeated when there is a symbol name identical to the symbol name of the symbol of the selected circuit component in the symbol library 11d. When there is no symbol having a symbol name identical to the symbol name of the symbol of the selected circuit component in the symbol library 11d (No, in operation S25), the comparison unit 13b stores the current symbol name of the symbol of the circuit component that is a target to be migrated in the item "final symbol name" of the selected circuit component that is a target to be migrated in the symbol list information (operation S27). The comparison unit 13b determines whether or not all circuit components that are targets to be migrated are selected (operation S28). When not all circuit components that are targets to be migrated are selected (No, in operation S28), the flow proceeds to operation S20, and the comparison unit 13b performs selection of an unselected circuit component that is a target to be migrated. On the other hand, all circuit components that are targets to be migrated are selected (Yes, in operation S28), the flow proceeds to operation S14 in FIG. 17.

As illustrated in FIG. 17, the registration unit 13c registers a symbol of a circuit component that is a target to be migrated and of which there is no symbol having a shape similar to the shape of the symbol in the migration destination in the migration destination component information 11b (operation S14). The update unit 13d updates the component name and the symbol name of a circuit component that is a target to be migrated included in the migration information 11e to the component name and the symbol name of the migration destination based on the correspondence information 11a and the symbol list information (operation S15), and the process ends.

As described above, the circuit component migration apparatus 10 identifies a circuit component of a migration destination corresponding to a circuit component that is a target to be migrated, based on the correspondence information 11a that is stored in the storage unit 11 and indicates a circuit component of a migration destination corresponding to a circuit component of a migration source. In addition, the circuit component migration apparatus 10 compares the shape of a symbol representing the identified circuit component of the migration destination with the shape of a symbol representing a circuit component that is a target to be migrated. In addition, when the shape of the symbol representing the identified circuit component of the migration destination is not similar to the shape of the symbol representing the circuit component that is a target to be migrated based on the comparison result, the circuit component migration apparatus 10 associates the symbol representing the circuit component that is a target to be migrated with the identified circuit component of the migration destination and registers the associated symbol and identified circuit component in the component information 11b that stores information on a circuit component of a migration destination. Therefore, in the circuit component migration apparatus 10, when the shape of a symbol representing a circuit component that is a target to be migrated is not similar to the shape of a symbol of the migration destination, the symbol representing the circuit component that is a target to be migrated is registered in the component information 11b of the migration destination. As a result, in the circuit component migration apparatus 10, even when the shape of a symbol of a circuit component that is a target to be migrated is different from the shape of a symbol of a circuit component of a migration destination corresponding to the circuit component that is a target to be migrated, the symbol of the circuit component that is a target to be migrated is allowed to be taken over to migrate the circuit component.

In addition, the circuit component migration apparatus 10 compares the symbol name of a symbol representing a circuit component of a migration destination with the symbol name of a symbol representing a circuit component that is a target to be migrated. In addition, when the shapes of the symbols are different and the symbol names of the symbols are different, the circuit component migration apparatus 10 registers the symbol representing the circuit component that is a target to be migrated with the symbol name of the circuit component that is a target to be migrated. In addition, when the shapes of the symbols are different and the symbol names of the symbols are identical, the circuit component migration apparatus 10 registers the symbol representing the circuit component that is a target to be migrated by changing the symbol name. Therefore, in the circuit component migration apparatus 10, when the shapes of symbols are different and the symbol names of the symbols are different, the symbol name of the symbol representing the circuit component that is a target to be migrated is allowed to be taken over to migrate the circuit component. In addition, in the circuit component migration apparatus 10, when the shapes of the symbols are different and the symbol names of the symbols are identical, registration of the symbols having the identical symbol name in the migration destination is allowed to be suppressed.

In addition, in the circuit component migration apparatus 10, a symbol representing a circuit component that is a target to be migrated is registered in the component information 11b of a migration destination. As a result, in the circuit component migration apparatus 10, circuit design software of the migration destination is allowed to manage a circuit component migrated from a migration source and a circuit component of the migration destination using the component information 11b.

In addition, the circuit component migration apparatus 10 is allowed to register a mere circuit component included in the migration information 11e, in the component information 11b of a migration destination by including the mere circuit component to be migrated in the migration information 11e and performing the migration. As a result, according to the circuit component migration apparatus 10, an increase in a data amount of the component information 11b of the migration destination due to the migration is allowed to be suppressed.

[Second Embodiment]

The first embodiment related to the apparatus discussed herein is described above, and the technology discussed herein may be implemented in a variety of different forms in addition to the above-described first embodiment. Another embodiment is described below.

For example, in the above-described first embodiment, the case is described in which the obtaining unit 12 obtains the migration information 11e and the migration source component information 11f; however, the apparatus discussed herein is not limited to the case. For example, when the migration information 11e includes information related to a component name, a symbol name, and a symbol of a circuit component that is a target to be migrated, the apparatus discussed herein may obtain the mere migration information 11e and perform the migration process based on the information included in the migration information 11e.

In addition, in the above-described first embodiment, the case is described in which the storage unit 11 stores the migration destination component information 11b, however, the apparatus discussed herein is not limited to the case. For example, the migration destination component information 11b may be stored in another computer or an external storage device that is allowed to communicate with the circuit component migration apparatus 10.

In addition, in the above-described embodiment, the case is described in which the migration destination component information 11b includes the component library 11c and the symbol library 11d, however, the apparatus discussed herein is not limited to the case. For example, the migration destination component information 11b may include any data configuration as long as the data configuration is allowed to identify a component name and a symbol of each circuit component.

In addition, each of the configuration elements of the illustrated units is a conceptual feature, and the physical configuration as illustrated in the drawings may not be desired. That is, a concrete state of distribution or integration of each of the units is not limited to the illustrated state, and each of the configuration elements may be configured so that all or a part of each of the units is functionally or physically distributed or integrated in a given group depending on various loads, usage statuses, etc. For example, the processing units such as the identification unit 13a, the comparison unit 13b, the registration unit 13c, and the update unit 13d that are illustrated in FIG. 1 may be integrated as appropriate. In addition, the process of each of the identification unit 13a and the comparison unit 13b may be divided into processes of a plurality of processing units as appropriate. In addition, the processing function performed in each of the processing units may be entirely or partially achieved by a CPU and a program analyzed and executed by the CPU, and alternatively, the processing functions may be achieved using hardware implemented by wired logic.

[Circuit Component Migration Program]

Figure 19:
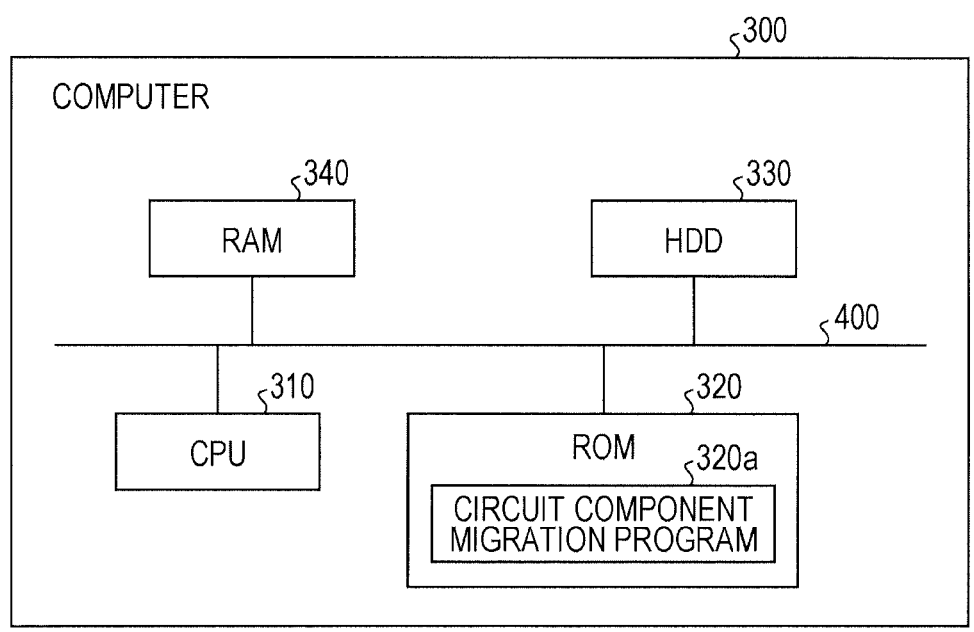
FIG. 19 illustrates a computer that executes a circuit component migration program.

In addition, the various processes described in the above-described embodiments may also be achieved by executing a program prepared beforehand in a computer system such as a personal computer and a workstation. An example of a computer system that executes a program including a function similar to the function of the above-described embodiments is described below. FIG. 19 illustrates a computer that executes a circuit component migration program.

As illustrated in FIG. 19, a computer 300 includes a CPU 310, a read only memory (ROM) 320, a hard disk drive (HDD) 330, and a random access memory (RAM) 340. The configuration elements 300 to 340 are coupled to each other through a bus 400. In the HDD 330, a table including a function similar to the function of each of the tables illustrated in FIG. 1 is stored.

In the ROM 320, a circuit component migration program 320a including a function similar to each of the functions of the identification unit 13a, the comparison unit 13b, the registration unit 13c, and the update unit 13d described in the above-described first embodiment is stored beforehand. The function of the circuit component migration program 320a may be divided into a plurality of functions.

In addition, the CPU 310 executes the circuit component migration program 320a by reading the circuit component migration program 320a from the ROM 320, so that an operation similar to the operation of each of the processing units described in the first embodiment is executed. That is, the circuit component migration program 320a executes an operation similar to the operation of each of the identification unit 13a, the comparison unit 13b, the registration unit 13c, and the update unit 13d that are described in the first embodiment.

The above-described circuit component migration program 320a may not be stored in the ROM 320 beforehand. For example, the program may be stored in a "portable physical medium" inserted into the computer 300 such as an FD, a CD-ROM, a digital versatile disc (DVD), an optical magnetic disk, and an IC card. In addition, the computer 300 may execute the program by reading the program from the "portable physical medium".

In addition, the program may be stored in "another computer (or server)", etc. that is coupled to the computer 300 through a public line, the Internet, a LAN, a WAN, etc. In addition, the computer 300 may execute the program by reading the program from the "another computer (or server)".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A circuit component migration apparatus for a computer-aided design (CAD) system comprising:
    a memory configured to store component information of a migration source including names and images of symbols representing circuit components of the migration source, component information of a migration destination including names and images of symbols representing circuit components of the migration destination, and correspondence information indicating a circuit component of the migration destination corresponding to a circuit component of the migration source; and
    a processor coupled to the memory and configured to execute a process comprising:
    identifying a circuit component of the migration destination corresponding to a circuit component of the migration source to be migrated based on the correspondence information;
    comparing a name and an image of a symbol representing the identified circuit component of the migration destination with a name and an image of a symbol representing the circuit component of the migration source to be migrated;
    when, as a result of the comparing, both the name of the symbol representing the identified circuit component of the migration destination is different than the name of the symbol representing the circuit component of the migration source to be migrated and the image of the symbol representing the identified circuit component of the migration destination is different than the image of the symbol representing the circuit component of the migration source to be migrated, registering both the name and the image of the symbol representing the circuit component of the migration source to be migrated as the name and the image of the symbol representing the identified circuit component of the migration destination;
    when, as a result of the comparing, the name of the symbol representing the identified circuit component of the migration destination is the same as the name of the symbol representing the circuit component of the migration source to be migrated and the image of the symbol representing the identified circuit component of the migration destination is different than the image of the symbol representing the circuit component of the migration source to be migrated, registering the image of the symbol representing the circuit component of the migration source to be migrated with a new name that is not identical to any of the names of the symbols representing the circuit components of the migration destination; and
    repeating the identifying, comparing, and registering for other circuit components of the migration destination.

2. A non-transitory computer-readable recording medium having stored therein a program for causing a computer to execute a process for circuit component migration for a computer-aided design (CAD) system, the process comprising:
    storing, in a memory unit, component information of a migration source including names and images of symbols representing circuit components of the migration source, component information of a migration destination including names and images of symbols representing circuit components of the migration destination, and correspondence information indicating a circuit component of the migration destination corresponding to a circuit component of the migration source;

identifying a circuit component of the migration destination corresponding to a circuit component of the migration source to be migrated based on the correspondence information that is stored in the memory;

comparing a name and an image of a symbol representing the identified circuit component of the migration destination with a name and an image of a symbol representing the circuit component of the migration source to be migrated;

when, as a result of the comparing, both the name of the symbol representing the identified circuit component of the migration destination is different than the name of the symbol representing the circuit component of the migration source to be migrated and the image of the symbol representing the identified circuit component of the migration destination is different than the image of the symbol representing the circuit component of the migration source to be migrated, registering both the name and the image of the symbol representing the circuit component of the migration source to be migrated as the name and the image of the symbol representing the identified circuit component of the migration destination;

when, as a result of the comparing, the name of the symbol representing the identified circuit component of the migration destination is the same as the name of the symbol representing the circuit component of the migration source to be migrated and the image of the symbol representing the identified circuit component of the migration destination is different than the image of the symbol representing the circuit component of the migration source to be migrated, registering the image of the symbol representing the circuit component of the migration source to be migrated with a new name that is not identical to any of the names of the symbols representing the circuit components of the migration destination; and repeating the identifying, comparing, and registering for other circuit components of the migration destination.

3. A method for circuit component migration for a computer-aided design (CAD) system by which a computer performs respective processing, the method comprising:

storing, in a memory, component information of a migration source including names and images of symbols representing circuit components of the migration source, component information of a migration destination including names and images information of symbols representing circuit components of the migration destination, and correspondence information indicating a circuit component of the migration destination corresponding to a circuit component of the migration source;

identifying a circuit component of the migration destination corresponding to a circuit component of the migration source to be migrated based on the correspondence information that is stored in the memory;

comparing a name and an image of a symbol representing the identified circuit component of the migration destination with a name and an image of a symbol representing the circuit component of the migration source to be migrated;

when, as a result of the comparing, both the name of the symbol representing the identified circuit component of the migration destination is different than the name of the symbol representing the circuit component of the migration source to be migrated and the image of the symbol representing the identified circuit component of the migration destination is different than the image of the symbol representing the circuit component of the migration source to be migrated, registering both the name and the image of the symbol representing the circuit component of the migration source to be migrated as the name and the image of the symbol representing the identified circuit component of the migration destination;

when, as a result of the comparing, the name of the symbol representing the identified circuit component of the migration destination is the same as the name of the symbol representing the circuit component of the migration source to be migrated and the image of the symbol representing the identified circuit component of the migration destination is different than the image of the symbol representing the circuit component of the migration source to be migrated, registering the image of the symbol representing the circuit component of the migration source to be migrated with a new name that is not identical to any of the names of the symbols representing the circuit components of the migration destination; and repeating the identifying, comparing, and registering for other circuit components of the migration destination.

* * * * *